United States Patent [19]

Beni et al.

[11] Patent Number: 4,545,713

[45] Date of Patent: Oct. 8, 1985

[54] WAVEGUIDE ROBOT SYSTEM FOR LASER BEAM

[75] Inventors: Gerardo Beni, Old Bridge; Thomas J. Bridges, Holmdel; Susan Hackwood, Freehold; Chinlon Lin, Holmdel, all of N.J.

[73] Assignee: AT&T Bell Laboratories, Murray Hill, N.J.

[21] Appl. No.: 550,617

[22] Filed: Nov. 10, 1983

[51] Int. Cl.⁴ .............................................. B25J 19/00
[52] U.S. Cl. .................................... 414/1; 128/303.1; 901/15; 901/42; 901/50; 901/47; 219/121 LU
[58] Field of Search .................... 414/1, 719, 730, 736; 901/15, 42, 47, 50; 219/121 LU, 121 LQ; 128/303.1, 395–398

[56] References Cited

U.S. PATENT DOCUMENTS

| | | | |
|---|---|---|---|
| 3,913,582 | 10/1975 | Sharon | 128/303.1 |
| 4,364,535 | 12/1982 | Itoh et al. | 901/15 X |
| 4,459,986 | 7/1984 | Karaki | 128/303.1 |
| 4,473,074 | 9/1984 | Vassiliadis | 128/303.1 |

OTHER PUBLICATIONS

"Major Advance by British Company in Automatic Laser Processing," *Sensor Review*, Apr. 1983, pp. 64–66.

*Primary Examiner*—Terrance L. Siemens
*Attorney, Agent, or Firm*—David I. Caplan

[57] ABSTRACT

An articulating waveguide arm assembly, comprising long arm segments, (11, 12, 15, 17, 19) and short corner segments (13, 14, 16, 18) has a single-mode hollow dielectric waveguide located inside each segment and an optically reflecting device (33, 34, 37, 38, 39) located at the end of each segment. The waveguide assembly is mechanically affixed to a robot assembly having protruding side shields (65, 66). The robot assembly includes a pair of long arms (61, 62) corresponding to a pair of the waveguide arms (15, 17). Another waveguide arm segment (12) of the waveguide assembly passes over the protruding side shields and terminates in a pair of successive corner segments (13, 14) for enabling a laser beam propagating through this long arm segment to enter into one of the pair of long waveguide segments (61). The robot arm segments control the orientation of corresponding articulating waveguide arm segments, whereby a laser beam entering the articulating waveguide arm assembly will exit from the waveguide assembly positioned and oriented as determined by the positions and orientations of the robot arm segments.

9 Claims, 3 Drawing Figures

WAVEGUIDE ROBOT SYSTEM FOR LASER BEAM

FIELD OF THE INVENTION

This invention relates to waveguide robot systems for positioning and orienting a laser beam.

BACKGROUND OF THE INVENTION

In the art of industrial welding, soldering, cutting, etc., it is desirable to have a high power laser output beam positioned and oriented by a robot, comprising movable robotic arms, to form a laser beam waveguide robot system. For certain laser sources of a high power base, such as the Nd:YAG laser, which have a significant wavelength in the one micron region of the spectrum, flexible optical fiber waveguides—e.g., silica glass fibers—may be used for guiding the high power laser beam over a distance of the order of the length of a robot arm. Such fibers can be either routed inside the robot arm or attached externally to the side of the arm. At the present time, however, flexible optical fibers for guiding high power infrared laser beams—e.g., beams of ten microns wavelength from the $CO_2$ laser—are unavailable in the single-mode form desired for robotic arms, and also such fibers tend to suffer from too much optical loss and to be too fragile for practical use. Therefore, present-day fibers cannot readily be used for guiding a $CO_2$ laser beam. On the other hand, the $CO_2$ infrared laser can develop significantly more power than a Nd:YAG laser, and for many applications the ten micron radiation of the $CO_2$ laser is more suitable than the one micron Nd:YAG radiation; therefore, it is desirable to have a robot system for a $CO_2$ laser.

Accordingly, one approach in prior art is to guide the $CO_2$ laser beam through a suitable optical waveguide affixed to a robot, as disclosed in an article entitled, "Major Advance by British Company in Automatic Laser Processing," in *Sensor Review*, pp. 64–66 (April 1983). That laser robot system, known as COBRA, includes an articulated optical light-guide in conjunction with a ASEA IRb6 robot and a Ferranti $CO_2$ laser. The light-guide is affixed onto the robot in such a manner that segments of the light-guide are aligned in a parallel configuration with corresponding segments of the robot arm. Such an alignment allows for coincidental movement of the robot arm and the light-guide which in turn minimizes the stress on the light-guide and allows for a three-dimensional range of freedom. This robot system, however, is of undesirably large size because of the large size of the robot and because of the large size of the conventional articulated arm used as a light-guide for ten micron radiation required to avoid diffraction effects. Moreover, such a simple configuration cannot be used in conjunction with robot assemblies of desirably smaller size, such as the "Microbot Alpha" robot, because such smaller robot assemblies include robot members—e.g., side shield members—which protrude outward from the body of the robot and which would obstruct the light-guide. These protruding side shield members are needed for achieving a compact overall robot assembly in which all the motors of the robot are accommodated in one place. It would therefore be desirable to have a laser robot system that can be used with a $CO_2$ laser in conjunction with a robot assembly having protruding side shield members, such as the Microbot Alpha.

An additional problem with articulated light-guides of the conventional type (as proposed in the above-mentioned article) is a wandering of the beam that is encountered as the arm is manipulated. This effect is encountered unless (1) the input beam is launched exactly on the axis of the light-guide, and (2) the swivel angles of the articulated light-guide are precisely equal to a right angle. In practice, such a situation is not obtainable, at least for any reasonable length of time during operation, and the exact position of the output beam is unpredictable—both undesirable effects, particularly in a robotic system.

Another approach for positioning and orienting a $CO_2$ laser beam would be to use the robot gripper of a Microbot Alpha to hold and manipulate the laser-output tip of an articulated arm assembly, that is, a light-guide divided into rigid sections with revolute joints—i.e., joints in a section which divide that section into two parts which can rotate with respect to each other about the (common) axis of that section and which thus enable the neighboring sections of the articulated light-guide arm to revolve around that axis. Reorientation of the laser beam output in this approach, however, would require complex reconfiguration of the light-guide sections, involving rotations of all revolute joints. Such complex reconfigurations of the light-guide sections would require the robot to follow a complicated path dictated by the light-guide assembly, thereby preventing a desirable continuous rotation capability of the laser-output tip. In addition, it would be necessary to attach a force and torque sensor on the robot gripper in order to ensure that the articulated light-guide arm is not damaged by stresses produced therein when the robot attempts to reconfigure the arm. However, such technology as force and torque sensors is beyond present-day state-of-the-art robotics, since even the turning of a simple two-link crank by a robot arm is a complex compliance problem not yet properly solved.

SUMMARY OF THE INVENTION

This invention mitigates the problem of stress suffered in a robot system by a waveguide arm assembly whose movements are controlled by a robot assembly having protruding members. The robot assembly has one or more movable rigid robot arms. The waveguide is a configuration of rigid waveguide arm segments and rigid waveguide corner segments rigidly connected together. Each waveguide arm segment typically is significantly longer than a corner segment. Selected ones of the segments have revolute joints for enabling rotation of a portion of each selected segment with respect to the other portion thereof about the (common) axis of the selected segment, and hence enabling revolution of adjoining segments (adjoining the selected segments) around the axes of the selected segments.

In accordance with the invention, a laser robot system having a waveguide assembly attached to a robot assembly comprises:

(1) a first robot arm (61 in FIG. 1) having first and second mutually perpendicular robot axles (41 and 42) having first and second robot axes (41.5 and 42.5), respectively, for enabling motion of the robot arm;

(2) first and second waveguide arm segments (11 and 12) rigidly oriented at a right angle to each other, the second waveguide arm segment (12) being affixed to the robot assembly so that the first waveguide arm segment (11) is aligned colinearly with the first robot axis (41.5);

(3) first and second waveguide corner segments (13 and 14) rigidly oriented at a right angle to each other, whereby the first waveguide corner segment (13) is rigidly oriented to the second waveguide arm segment (12) so that the first corner segment (13) is oriented parallel to the first waveguide arm segment (11), and the second corner segment is oriented parallel to the second arm segment;

the length of the first corner segment (13) being equal to the distance between an axis passing through the center of the second arm segment and the axis (42.5) of the second robot axle (42) so that the second corner segment (14) is aligned colinearly with the second robot axis (42.5); and (4) a third waveguide arm segment (15) rigidly oriented at a right angle to the second waveguide corner segment (14), the second waveguide corner section (14) having a revolute joint whereby the third waveguide arm segment (15) can revolve around the second robot axis (42.5) in a plane perpendicular to the second robot axis (42.5).

The first waveguide arm segment (11) advantageously also has a revolute joint (71) to enable the waveguide assembly to undergo prescribed movements in response to corresponding movements of the robot assembly.

To the foregoing assembly there can advantageously be added a second robot arm segment (62) with third and fourth parallel robot axles (43 and 44), one axle positioned at each end of said second robot arm (62) so that the second robot arm segment is rotatable with respect to the first robot arm segment around the third robot axle (43). Moreover, a third waveguide corner segment (16) is rigidly oriented at a right angle to the third wavguide arm segment (15) and is aligned colinearly with the axis (43.5) of the third robot axle (43). Further, a fourth waveguide arm segment (17) advantageously can be rigidly oriented at a right angle to the third waveguide corner segment (16).

Moreover, onto the fourth waveguide arm segment (17) a fourth waveguide corner segment (18) advantageously can be rigidly connected and oriented at a right angle thereto, so that the fourth waveguide corner segment (18) is aligned colinearly with the fourth axis (44.5) of the fourth robot axle (44).

In a specific embodiment of the invention, the robot assembly is typically a Microbot Alpha, from which there have been removed both the side-casing (but not side shields) and hand-gripper. The various robot arm segments of the robot assembly are positioned by cables controlled by motors. The waveguide assembly is typically a modified Bridges-Strnad type of articulated waveguide arm assembly with revolute joints, as described more fully in U.S. patent application Ser. No. 338,871 entitled "Articulated Arm Radiation Guide," filed by T. J. Bridges et al (12-2) on Jan. 12, 1982.

The undesirable effects in prior art can be eliminated and at the same time the articulated light-guide can be made much more compact and suitable for the desirably smaller robot system by using the modified Bridges-Strnad type of articulated waveguide arm assembly. This waveguide uses hollow dielectric waveguides to guide the radiation in a particular predictable path and to eliminate spreading of the beam due to diffraction. As a result, the Bridges-Strnad arm is compact and has high pointing accuracy, both properties being desirable for use in the present context.

DETAILED DESCRIPTION

Figure 1:
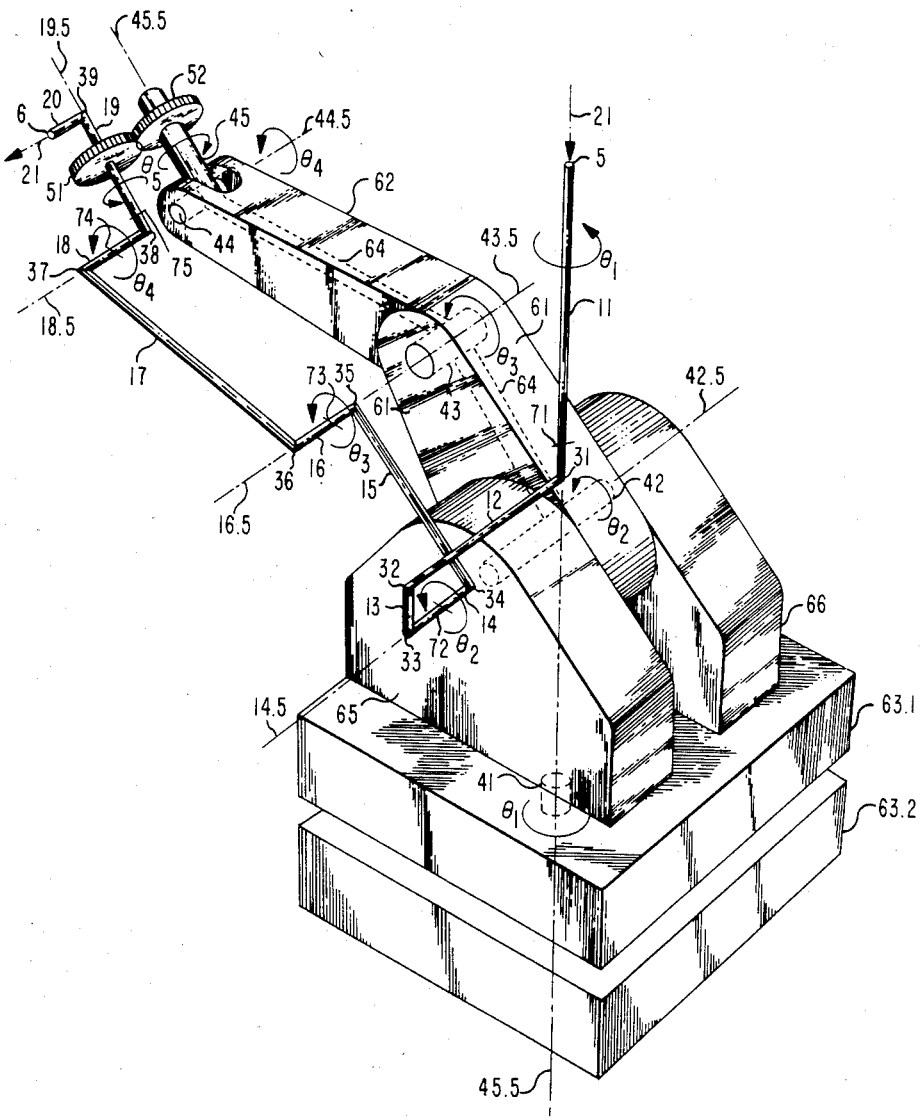
FIG. 1 is a perspective view of a robot system including a robot arm assembly controlling a waveguide arm assembly for positioning and orienting a laser beam, in accordance with an embodiment of the invention.

In FIG. 1, the robot system 100 includes a master robot arm assembly, more specifically a Microbot Alpha with modifications described below, and a slave waveguide arm assembly. By "master" and "slave" is meant that movements of the master robot assembly produce corresponding movements in the slave waveguide assembly. The master robot arm assembly comprises upper robot arm 61, robot forearm 62, together with robot axles 41, 42, 43, 44, and 45. The upper robot arm 61 is pivoted on a pair of robot side shields 65 and 66 by means of the axle 42, and the side shields 65 and 66 are mounted upon a upper base portion 63.1 which can rotate through a prescribed angle $\theta_1$ around a vertical axis 41.5 relative to a lower base portion 63.2 of the Microbat Alpha. The slave waveguide arm assembly comprises relatively long straight rigid waveguide arm segments 11, 12, 15, 17, 19, and 20, together with relatively short straight rigid waveguide corner segments 13, 14, 16, and 18. Each such waveguide segment—whether a corner or an arm segment—is rigidly connected to the next succeeding segment, and each such waveguide segment contains a preferably single-mode, hollow dielectric waveguide cylinder (not shown in the Figures). A beam of optical radiation 21 from an appropriate source (not shown)—for example, a $CO_2$ laser—is accepted by the slave waveguide assembly through a waveguide opening 5, located at the end of the waveguide arm segment 11. The radiation is guided successively through the straight waveguide segments 11, 12, 13, 14, . . . 20. Optically mirror devices (hidden in FIG. 1, shown as mirrors 37, 38, and 39 in FIG. 2, and as mirrors 33 and 34 in FIG. 3) are positioned between different successive waveguide segments to direct radiation exiting from one into the next succeeding segment. For example, mirror 37, as illustrated in detail in FIG. 2, serves to direct the radiation emanating from waveguide arm segment 17 into waveguide corner segment 18. After propagation through all waveguide segments 11 through 20, the radiation exits from the slave waveguide assembly through another waveguide opening 6 located at the end of the waveguide arm segment 20.

Figure 2:
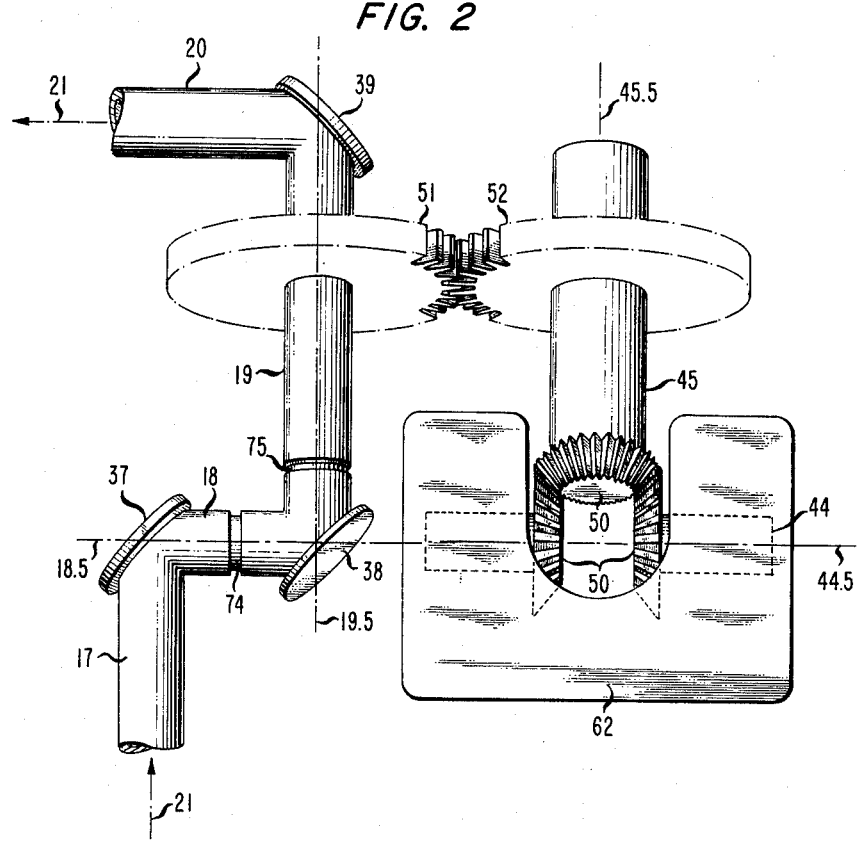
FIG. 2 is a side view, partly in perspective, of a remote end portion of the system depicted in FIG. 1.

The robot assembly (and hence the waveguide assembly) is maneuvered by gears, motors, and tendons (not shown) as known in the art. For example, some of the gears and motors are located inside the body of the robot assembly (in a region located between the side shields 65 and 66); remaining gears 50, 51, and 52 for transmitting mechanical forces for maneuvering the waveguide arm 20 are shown in FIG. 2. A remaining motor (not shown) and serves as a means for producing the prescribed rotation $\theta_1$ of the robot assembly about the axis 41.5. The various motors, situated in the body of the robot assembly, drive the gears which in turn set into motion the robot tendons 64. The tendons, typically steel cables, run over a series of pulley wheels (not shown), as known in the art, positioned at various locations of the robot arm assembly, whereby the robot arm segments 61, 62, and 45 can be made to rotate through angles $\theta_2$ through $\theta_4$, respectively; and the robot arm segment 45 is in the form of an axle and can also be made to spin through an angle $\theta_5$.

Physica connection between the master and slave arm can take a variety of forms; all that is required is a means of permanently aligning the first four robot axles 41 through 44, respectively, coaxially with the axes of the four waveguides segments 11, 14, 16, 18, as well as a means of permanently aligning the fifth robot axle 45 in parallel with the waveguide segment 19. Such an alignment is desirable for reducing the stress in the slave waveguide arms of the master robot arms during operation. To this end, the corner segments 14, 16, and 18 are each aligned permanently with the axes 42.5, 43.5, and 44.5, respectively, of the robot axles 42, 43, and 44, respectively, by connecting means (not shown in FIG. 1) as described in detail below in conjunction with FIG. 3. Revolute joints 71, 72, 73, 74, and 75, respectively, are located in waveguide segments 11, 14, 16, 18, and 19 in order to enable rotations of the waveguide segments. Due to the design of the robot assembly—in particular, the position of the side shields 65 and 66—it is desirable to have a coaxial alignment of the axes of the waveguide segments 11, 14, 16, and 18 with the axes 41.5, 42.5, 43.5, and 44.5, respectively, of the robot axles 41, 42, 43, and 44, respectively. The configuration of waveguide segments 12, 13, and 14 is desirable in which segment 12 extends horizontally over the side shield 65, while segment 13 extends vertically for a distance just long enough to align the axis of waveguide segment 14 with the robot axis 42.5, in order to ensure minimum stress during operation. By aligning the two arms in this manner, the axes of rotation of the robot assembly coincide with the corresponding axes of rotation of the waveguide assembly, i.e., a rotation of a master robot segment through a given angle corresponds to a rotation of a corresponding slave arm waveguide segment through the same angle.

Figure 3:
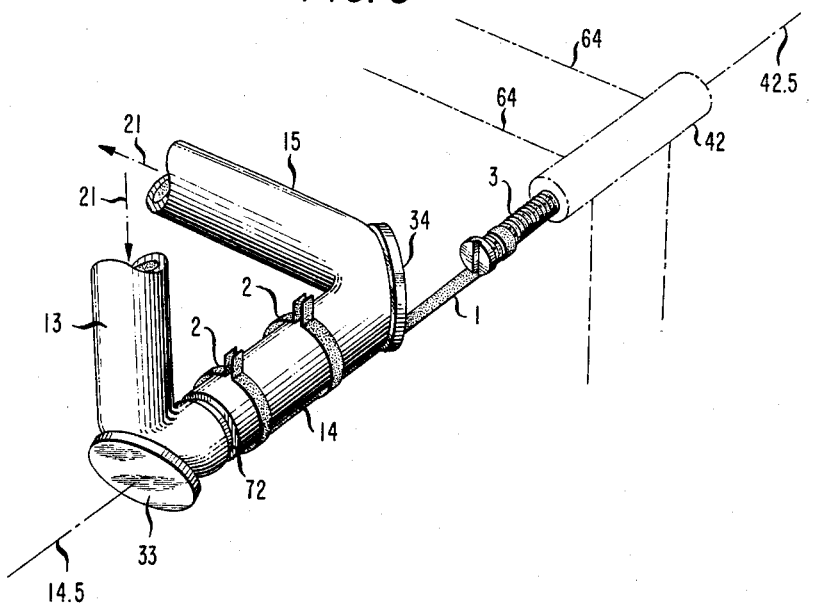
FIG. 3 is a perspective view of an intermediate portion of the system depicted in FIG. 1, in accordance with a specific embodiment of the invention.

FIG. 3 shows a portion of the robot assembly 100, illustrating an exemplary means by which the axis 14.5 of the waveguide segment 14, for example, can be properly and permanently aligned with corresponding robot axis 42.5. As shown in FIG. 3, a phosphor-bronze mechanical connecting clip 1 is attached to the waveguide corner segment 14 by means of a pair of spring connecting clamps 2 which serve to hold this corner segment 14 in place. The clip 1 is firmly connected onto a screw 3 which is firmly connected to and protrudes from the robot axle 42 in order to align the axis 14.5 of this corner segment 14 coaxially with respect to the robot axis 42.5. Similar connections are also made between waveguide segment 16 and robot axle 43, and between waveguide segment 18 and robot axle 44.

A mechanical connection between robot axle 45 and waveguide corner segment 19 is shown in greater detail in FIG. 2. This connection is achieved through the use of two identical, mutually meshing gears 51 and 52. The gears not only serve to keep the robot axle 45 and the axis of the waveguide segment 19 parallel but also serve to produce a wrist-type motion of the waveguide segment 20 analogous to that of the human wrist. Gear assembly 50, similar to part of a different gear assembly in an automobile, is activated by tendons (not shown) from the robot motor (not shown) and serves to drive gear 52 which in turn drives gear 51, thus enabling this wrist-type motion.

The following are typical dimensions for purposes of illustration: the distance between the axis 21 of waveguide arm segment 11 and the axis of waveguide corner segment 13 is about $10 \text{ cm} + (2.54/2) \text{ cm} = 11.27 \text{ cm}$, the lengths of waveguide corner segments 14, 16, and 18 are all equal to about 2.54 cm, the lengths of waveguide arm segments 15 and 17 are both about 17.78 cm, and the length of waveguide arm segment 19 is about 5 cm.

Although the invention has been described in detail in terms of a specific embodiment, various modifications can be made without departing from the scope of the invention. For example, the write-type action afforded by the waveguide segments 18, 19, and 20 can be omitted and the laser radiation can thus be allowed to exit at the end of the fourth waveguide arm segment 17 (omitting the mirror 37).

What is claimed is:

1. A waveguide robot system comprising:
   (a) first and second robot arm segments, the first arm segment having first and second mutually perpendicular axles to enable first and second rotations, respectively, of the first robot arm segment, and a third axle to enable movement of the second arm segment relative to the first arm segment;
   (b) side shields into which the second axle is mounted;
   (c) in succession, first and second waveguide arm segments, first and second waveguide corner segments, and a third waveguide arm segment, each such waveguide segment rigidly connected at one end at a right angle to another end of the next succeeding segment, the second waveguide corner segment having a revolute joint, the axis of the first waveguide arm segment aligned colinearly with the axis of the first robot axle, the axis of the second waveguide corner segment aligned colinearly with the axis of the second robot axle.

2. A configuration of waveguide segments afixed to a robot arm assembly comprising:
   (a) a first robot arm segment having first and second mutually perpendicular robot axles upon which the first robot arm segment can rotate;
   (b) first and second waveguide arm segments rigidly oriented at a right angle to each other;
   (c) first and second waveguide corner segments rigidly oriented at a right angle to each other, the first corner segment rigidly connected to the second waveguide arm segment so that the first waveguide arm segment and the first waveguide corner segment are spaced apart and parallel, and so that the second waveguide arm segment and the second waveguide corner segment are spaced apart and parallel;
   (d) means for aligning the axis of the second waveguide corner segment along the axis of the second robot axle; the length of the first corner segment being equal to the distance between the axis of the second waveguide arm segment and the axis of the second robot axle;
   (e) connecting means for aligning the first waveguide arm segment and the first robot axle along a common axis and for aligning the second waveguide corner segment and the second robot axis along another common axis; and
   (f) a third waveguide arm segment rigidly oriented at a right angle to the second waveguide corner segment, the second waveguide corner segment having a revolute joint for enabling the third waveguide arm segment to move in plane perpendicular to the second waveguide arm segment.

3. The configuration of claim 2 further comprising:
(a) a second robot arm segment with third and fourth mutually parallel robot axles positioned at opposite ends thereof, whereby the second robot arm segment is rotatable with respect to the first robot arm segment around the third robot axle;
(b) a third waveguide corner segment having a revolute joint and oriented rigidly to the third waveguide arm segment at a right angle thereto;
(c) a fourth waveguide arm segment rigidly oriented to the third waveguide corner segment at a right angle thereto;
(d) a fourth waveguide corner segment rigidly oriented to the fourth waveguide arm segment at a right angle thereto; and
(e) means for aligning the axis of the third waveguide corner segment colinearly with the axis of the third robot axle and for aligning the axis of the fourth waveguide corner segment colinearly with the axle of the fourth robot axle.

4. The configuration of waveguide segments affixed to the robot arm assembly of claim 3 further comprising:
(a) a fifth waveguide arm segment having a revolute joint and connected rigidly to the fourth waveguide corner segment at a right angle thereto;
(b) a sixth waveguide arm segment rigidly connected to the fifth waveguide arm segment at a right angle thereto;
(c) a third robot arm in the form of a fifth robot axle positioned perpendicular to the fourth robot axle whereby the fifth axle can revolve around the fourth robot axle; and
(d) connecting means for aligning the fifth waveguide arm segment and the fifth robot axle spaced apart and mutually parallel.

5. A waveguide robot system comprising:
(a) first and second waveguide corner segments of an articulable waveguide assembly, each segment having a different axis, the segments being joined together so that their axes form a right angle;
(b) first and second waveguide arm segments of the articulable waveguide assembly, each having a different axis, the arm segments being joined together so that their axes form a right angle, the second arm segment joined to the first corner segment so that their axes form a right angle, whereby the first corner and the first arm segments are parallel, and the second corner and the second arm segments are parallel;
(c) a third waveguide arm segment, having an axis which is different from those of the first and second waveguide arm segments, the second waveguide corner and the third waveguide arm segments joined together so that their axes form a right angle;
(d) a first robot arm segment having first and second robot axle proximate an end thereof, rotatable with respect to first and second mutually perpendicular robot axes of rotation of the first and second robot axles, respectively; and
(e) connecting means for aligning the axis of the first waveguide arm segment colinearly with the first robot axis and for aligning the axis of the second corner segment colinearly with the second robot axis;
the second waveguide corner segment having a revolute joint, whereby a section of the second waveguide corner segment which extends inward towards the robot assembly from the revolute joint is free to spin around the second robot axis.

6. The system of claim 5 further comprising:
(a) a third waveguide corner segment, a fourth waveguide arm segment, and a fourth waveguide corner segment, each such segment having a different axis, and the third waveguide corner segment joined to the third waveguide arm segment so that their axes form a right angle, the fourth waveguide arm segment and the third waveguide corner segment being joined together so that their axes form a right angle, and the fourth waveguide corner segment being joined to the fourth waveguide arm segment so that their axes form a right angle;
(b) a second robot arm segment, the second robot arm segment connected to and rotatable with respect to the first robot arm segment around a third robot axle having a third robot axis of the articulable robot arm assembly parallel to the second robot axis, the third robot axle located proximate to another end of the first robot arm segment and an end of the second robot arm segment; and
(c) connecting means for aligning the axis of the third waveguide corner segment colinearly with the third robot axis of rotation and for aligning the axis of the fourth waveguide corner segment colinearly with a fourth robot axis of a fourth robot axle parallel to the third robot axis and being located proximate to another, opposite end of the second robot arm;
the third and the fourth waveguide corner segments each having a separate revolute joint, whereby a section of the third waveguide corner segment, such section extending outward from the corresponding revolute joint, can spin around the third robot axis and the fourth waveguide arm and joint segments can revolve around the third robot axis, and whereby a section of the fourth waveguide corner segment, such section extending inward from the revolute joint can rotate around the fourth robot axis of rotation.

7. The system of claim 6 further comprising:
(a) fifth and sixth waveguide arm segments, each having a different axis, the fifth waveguide arm segment and the fourth waveguide corner segment joined together so that their axes form a right angle, and the sixth waveguide arm segment joined to the fifth waveguide arm segment so that their axes form a right angle;
(b) a third robot arm in the form of a fifth robot axle having a fifth robot axis of rotation, perpendicular to the fourth robot axis of rotation, whereby the axis of the fifth waveguide arm segment and the fifth robot axis of rotation remain parallel; and
(c) first and second mutually meshing gears rigidly connected to the fifth waveguide arm segment and to the fifth robot axle, respectively, whereby the axis of the fifth waveguide arm segment passes through the center of the first gear, and the fifth robot axis of rotation passes through the center of the second gear;
the fifth waveguide arm segment having a separate revolute joint, whereby the section of a fifth waveguide arm above the revolute joint and the sixth waveguide arm segment may revolve about the axis of the fifth waveguide arm segment.

8. The system of claim 7 in which the fourth waveguide arm segment is equal in length to that of said third waveguide arm segment.

9. The systm of claim 7 in which the second, third, and fourth waveguide corner segments are of equal length.

* * * * *

UNITED STATES PATENT AND TRADEMARK OFFICE
CERTIFICATE OF CORRECTION

PATENT NO. : 4,545,713

DATED : October 8, 1985

INVENTOR(S) : Gerardo Beni, Thomas J. Bridges, Susan Hackwood, Chinlon Lin

It is certified that error appears in the above-identified patent and that said Letters Patent is hereby corrected as shown below:

Column 8, line 68, "a" should read --the--.

Signed and Sealed this

Twenty-fifth Day of February 1986

[SEAL]

Attest:

Attesting Officer

DONALD J. QUIGG

Commissioner of Patents and Trademarks